(12) United States Patent  
Chang (10) Patent No.: US 6,713,674 B2  
(45) Date of Patent: Mar. 30, 2004

(54) WIRE COLLECTION BOX

(76) Inventor: Chien Hua Chang, 4F, No. 51, Yuan-Hsin Rd., Hsichih City, Taipei Hsien (TW)

( * ) Notice: Subject to any disclaimer, the term of this patent is extended or adjusted under 35 U.S.C. 154(b) by 0 days.

(21) Appl. No.: 10/456,827

(22) Filed: Jun. 6, 2003

(65) Prior Publication Data

US 2004/0007371 A1 Jan. 15, 2004

(30) Foreign Application Priority Data

Jul. 9, 2002 (TW) ........................................ 91210383 U (51) Int. Cl.[7] .................................................. H01J 5/00
(52) U.S. Cl. .............................. 174/50; 174/58; 174/60; 220/3.2; 220/4.02; 248/906; 439/535
(58) Field of Search ............................... 174/50, 53, 57, 174/58, 60; 220/4.02, 3.8, 3.2; 248/906; 439/535

(56) References Cited

U.S. PATENT DOCUMENTS 5,721,394 A * 2/1998 Mulks ......................... 174/48
5,933,563 A * 8/1999 Schaffer et al. ............. 385/135
6,444,906 B1 * 9/2002 Lewis ......................... 174/53
6,518,500 B1 * 2/2003 Huang ......................... 174/50

* cited by examiner

Primary Examiner—Dhiru R Patel
(74) Attorney, Agent, or Firm—Quintero Law Office (57) ABSTRACT

A wire collection box includes a lower plate, four lateral plates and a wire plate. Each of the four lateral plates has a side thereof being joined to the lower plate and at least one lateral plate has a plurality of vertical wire passages with an upper opening at each of the wire passages. The wire plate is disposed on the lower plate and provides an extension receptacle for taking external electricity. The extension receptacle has at least a set of outlets. Further, the wire plate is attached with a plurality of wire take-in parts, which at least form a wire take-in group for the wire being located at one of the take-in parts and wound around the wire take-in group and passing through one of the wire passages for supplying electricity or transmitting signals.

9 Claims, 8 Drawing Sheets

WIRE COLLECTION BOX

BACKGROUND OF THE INVENTION

1. Field of the Invention

The present invention relates to a wire collection box, and particularly to an electric wire box, which can take in collected electric wires to avoid the electric wires being scattered in a mess.

2. Description of Related Art

It is known that the electrical power is utilized all the time in our daily life and the more the electrical products are developed, the more the electrical power is needed. In fact, the chance to taking the electricity or to transmit signals is increased largely since the personal computers with the peripheries have been developed. Of course, it is another chance to consume the electricity power due to the office equipment and the home electrical appliance being developed as well except the personal computers.

Accordingly, electric wires for transmitting the power or the signals are needed increasingly in company with the increasing power use. Usually, the outlets provided in a house or a building are sufficient for actual needs so that it is necessary to utilizes extension receptacles and each of the extension receptacles is a mode of single input with multiple outputs. That is, there are multiple outlets for being inserted with plugs of electric products. Taking a personal computer system as an example, it is quite often that the an extension receptacle is used for being inserted with plugs of the main unit, the printer, the mouse, the scanner, the modem, the keyboard, the speakers, the monitor and so on, respectively in addition to part of the periphery received the power or the signal from the computer. Mostly, the electrical wires and the signal lines with plugs are required to perform such connections. Besides, electrical appliances in the kitchen need the wire connections as well except the preceding example.

Furthermore, the power and the signal connections as foregoing are often kept inserted continuously such that the wires in the area of the power or the signal connections are scattered in a mess and become a foul place. Moreover, it is perplex to a user or a repairman while he has to look for the right wire and the right plug and conducts the maintenance or the repair of the electric equipment.

SUMMARY OF THE INVENTION

The crux of the present invention resides in that a wire collection box is disclosed to include a lower plate, four lateral plates and a wire plate. Each of the four lateral plates has a side thereof being joined to the lower plate and at least one lateral plate has a plurality of vertical wire passages with an upper opening at each of the wire passages. The wire plate is disposed on the lower plate and provides an extension receptacle for taking external electricity. The extension receptacle has at least a set of outlets. Further, the wire plate is attached with a plurality of wire take-in parts, which at least form a wire take-in group for the wire being located at one of the take-in parts and wound around the wire take-in group and passing through one of the wire passages for supplying electricity or transmitting signals.

BRIEF DESCRIPTION OF THE DRAWINGS

The present invention can be more fully understood by reference to the following description and accompanying drawings, in which:

FIGS. 8-1 and 8-2 are top and front views of a wiring disk.

DETAILED DESCRIPTION OF THE PREFERRED EMBODIMENT

Referring to FIGS. 1 to 6, a wire collection box of the present invention basically is a box, which includes a lower plate 1, four lateral plates 2 and a wire plate 4. Further, an upper lid 3 (not shown) and a fixture 5 can be included optionally.

Figure 1:
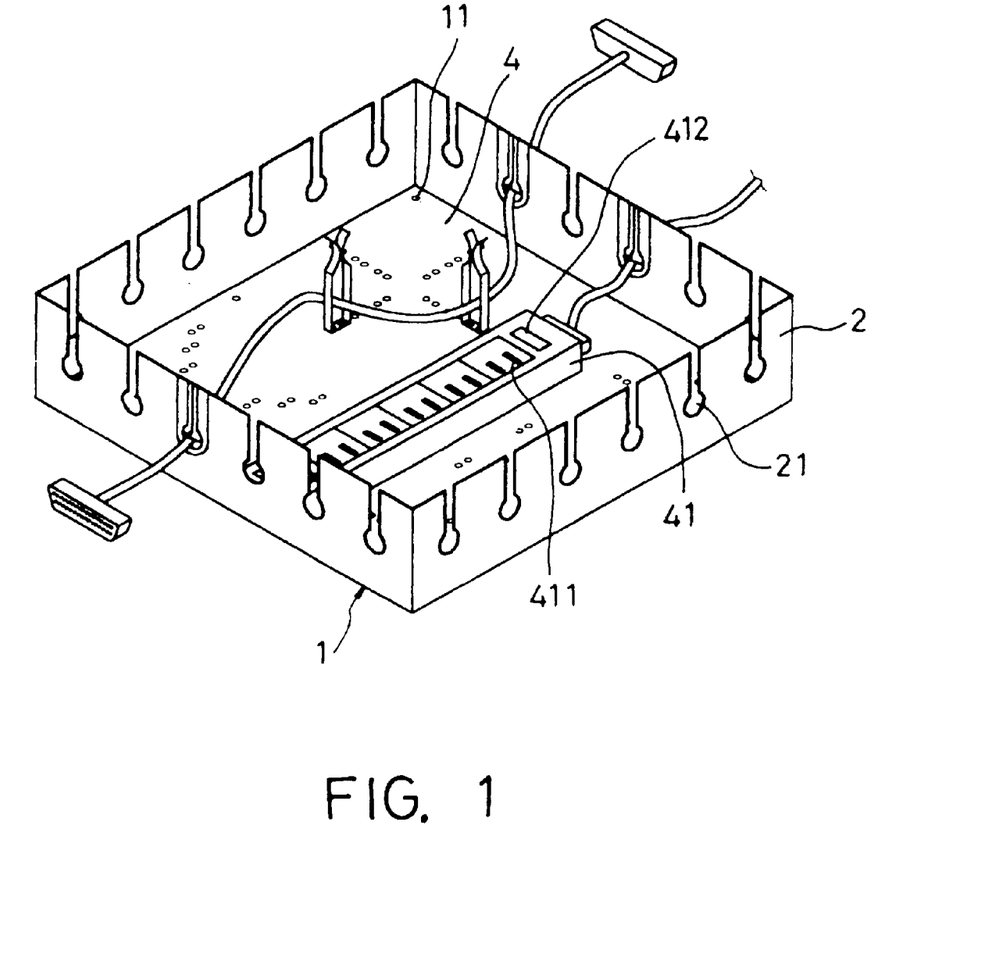
FIG. 1 is a perspective view of a wire collection box of the present invention.

Wherein, the lower plate 1 is flat for being attached to foreign area or fixedly attached with the wire plate 4 so that a plurality of piercing holes 11 are arranged therein. In order to be passed through by an outer disposed power switch, a switch opening 12 is provided at the lower plate 1. In case of the upper lid being provided, it is not necessary to have the switch opening 12. In addition, heat dissipation holes or grooves can be punched for increasing the cooling effect. The heat dissipation holes or grooves are known art so that no details will be described further.

Figure 4:
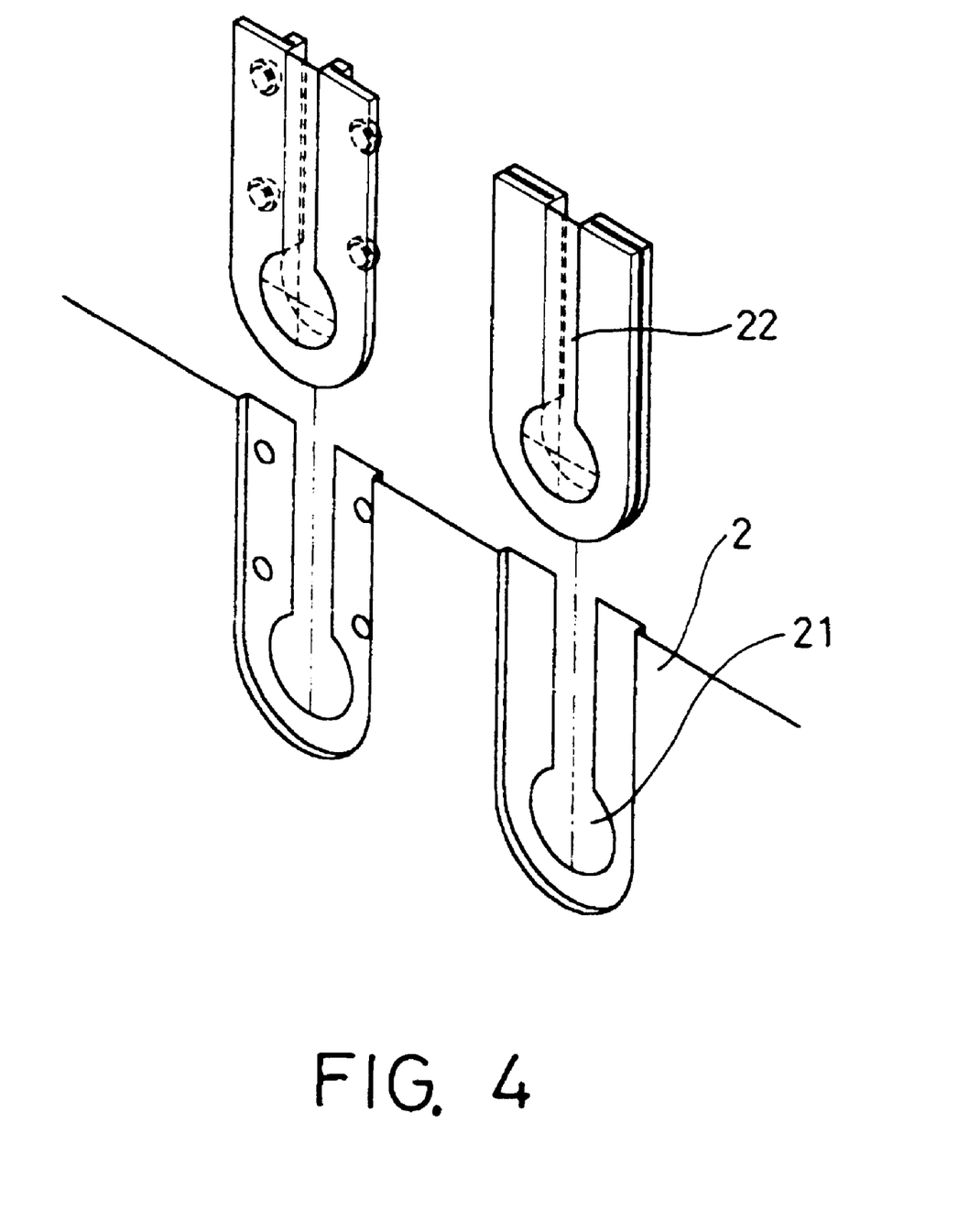
FIG. 4 is a perspective view illustrating wire outlets on the wire collection box shown in FIG. 1.

The lateral plates 2 enclose the surrounding of the box and at least one of the lateral plates 2 is provided with at least a wire passage 21 as an inlet or an outlet of a wire. It is preferable that two of the lateral plates 2 are provided with the wire passage 21 respectively as an inlet for an external power source line or a signal input line and an outlet for an output line or an output signal line being connected to an electric apparatus. The lateral plates 2 can be fixedly attached to the lower plate 1 or pivotally hinged to the upper lid 3. But, these are belonged to conventional art and no any detail will be described further. The wire passage 21 is a vertical slot with an enlarged lower circular end as shown in FIG. 4 so that two or more electric wires can be received in the circular end. In order to hide and protect the power line, a shield sheet 22 with a central split along the vertical slot and a central cross split portion at the circular end can be added by way of adhesive, insertion or the like.

The upper lid 3 has a size thereof equivalent to the lower plate 1 to cover the box. In case of the box being mounted facing up, the upper lid 3 can be omitted.

Figure 2:
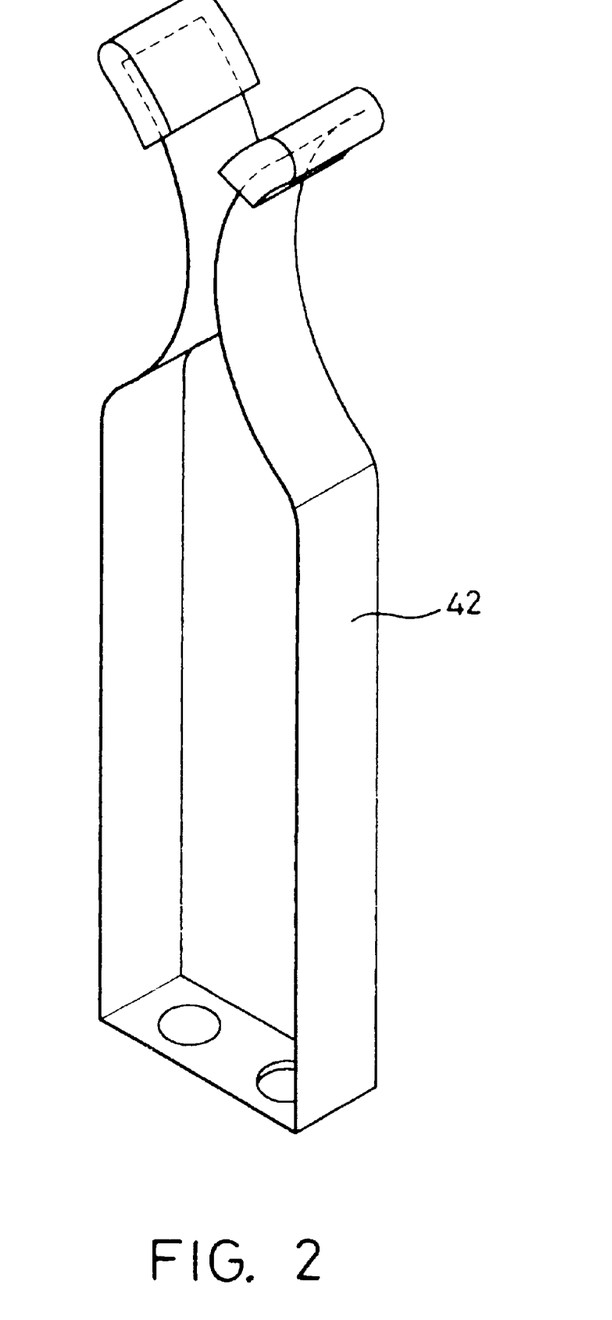
FIG. 2 is a perspective view of one of wire holders in the wire collection box shown in FIG. 1.
Figure 3:
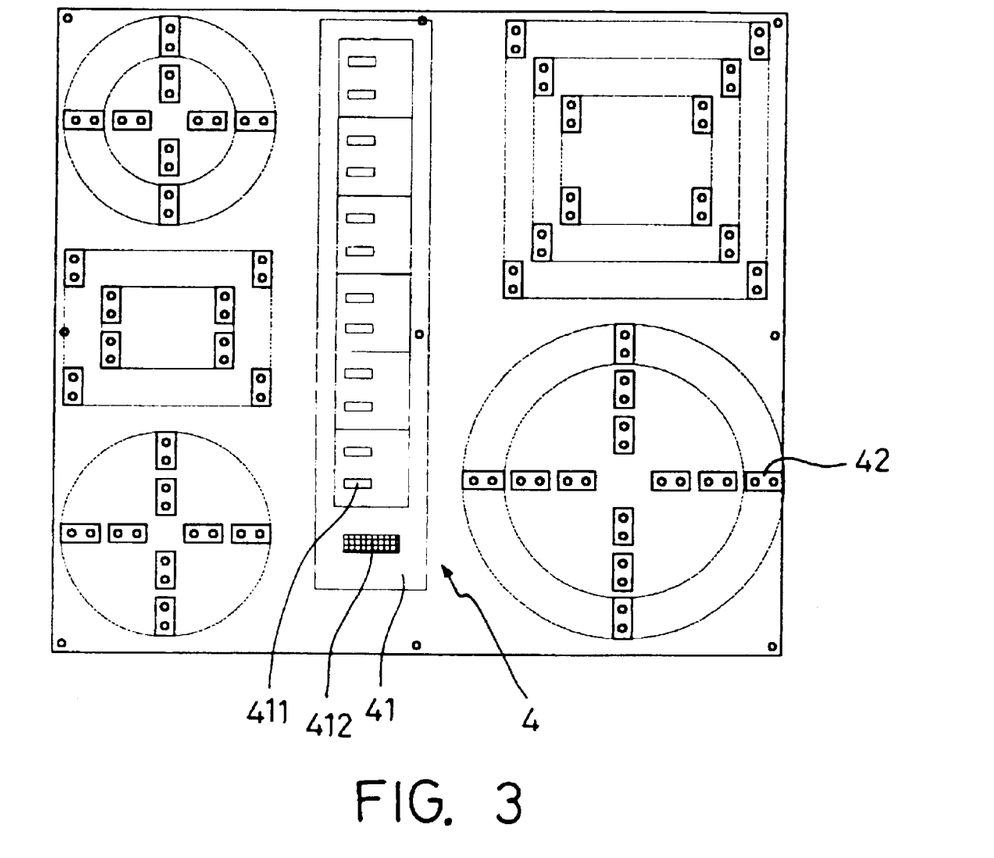
FIG. 3 is a plan view illustrating arrangement of all the wire holders in the wire collection box of the present invention.

The wire plate 4 as shown in FIG. 3 has fixedly attached with an extension receptacle 41 and the extension receptacle has at least one outlet 411 with a switch 412. The switch 412 can be connected to an external power source with a lead wire through the wire passage 2. In order to take in and arrange the electric wires, a plurality of take-in parts such as wire holders 42 are upright located at the wire plate 4 and certain wire holders 42 can be specified as different shapes and sizes of wire wound areas such as a square area, a circle area, a rectangle area and etc. such that each wire is wound as a specific area without confusion. Each of the wire holders 42 as shown in FIG. 2 can be made as a bent strip with a trumpet top. Alternatively, each of the take-in part can be a step wire spool disk as shown in FIGS. 8-1 and 8-2. The step wire spools are equivalents of the wire holders in function so that no details will be described further.

Figure 5:
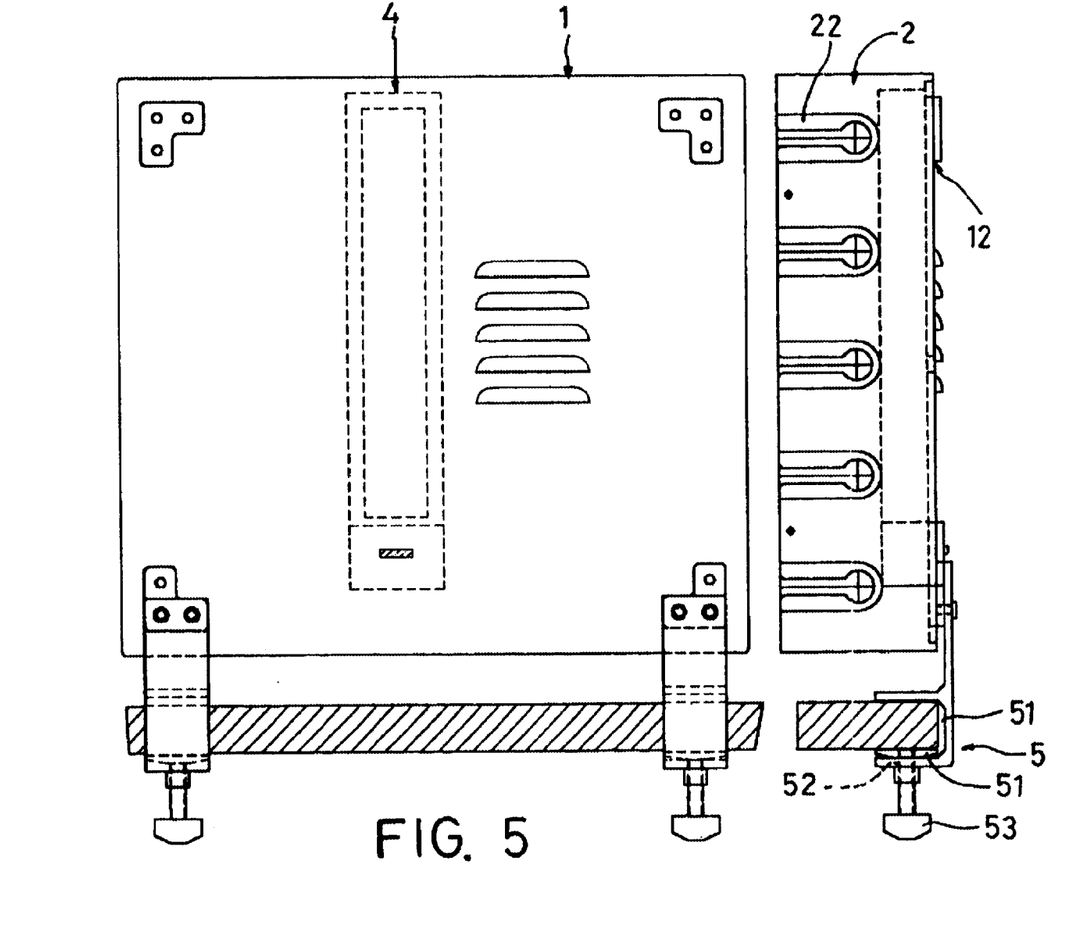
FIG. 5 is a sectional view of a fixture for the wire collection box of the present invention.
Figure 6:
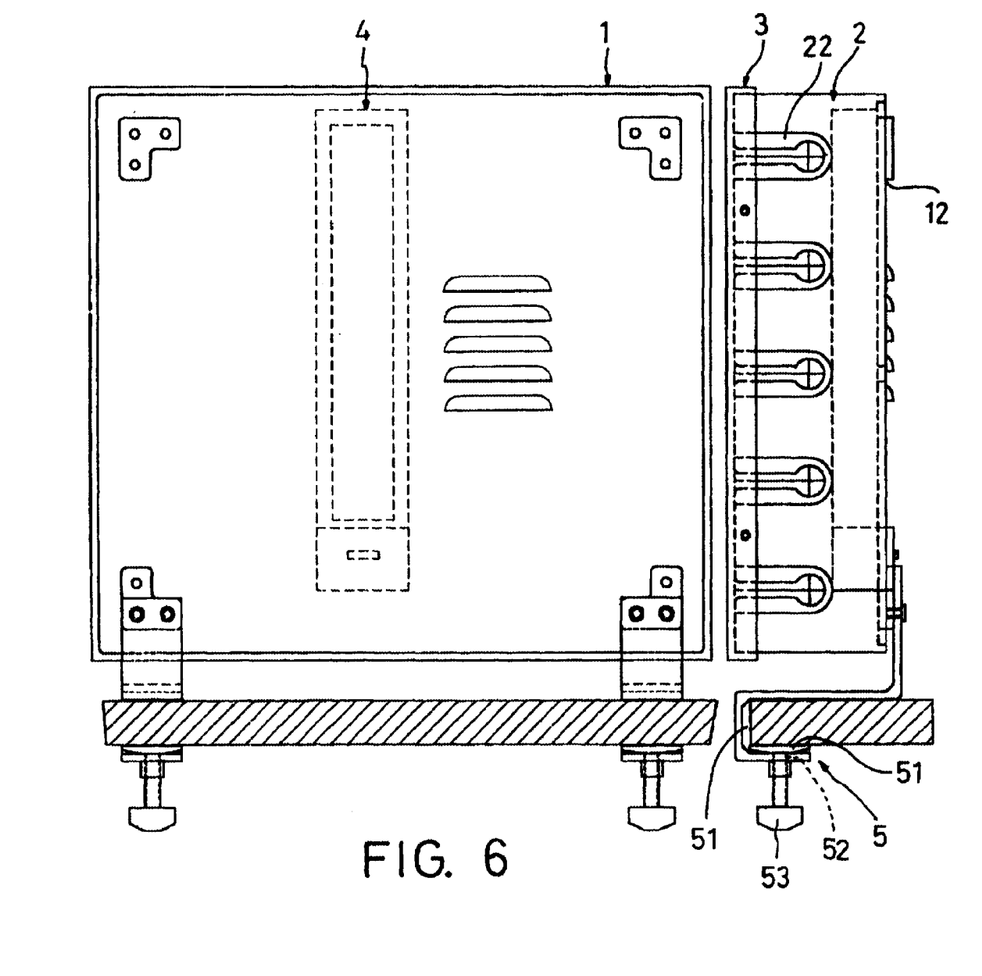
FIG. 6 is a sectional view of another embodiment of the fixture.

The fixture 5 is used for the wire collection box of the present invention being clamped to an external object such as the tabletop and it is not required to use the fixture 5 while the wire collection box is mounted to a wall as it is mentioned above. The fixture 5 is an integral bent plate with a spacing 51 for being inserted with the tabletop and a through hole 52 is provided in the fixture 5 for a screw 53 passing through and fastening to the tabletop. The fixture 5 can be made with an L shape or an inversed L shape to meet different situations. This is belonged to the conventional art so that no details will be described further.

Figure 7:
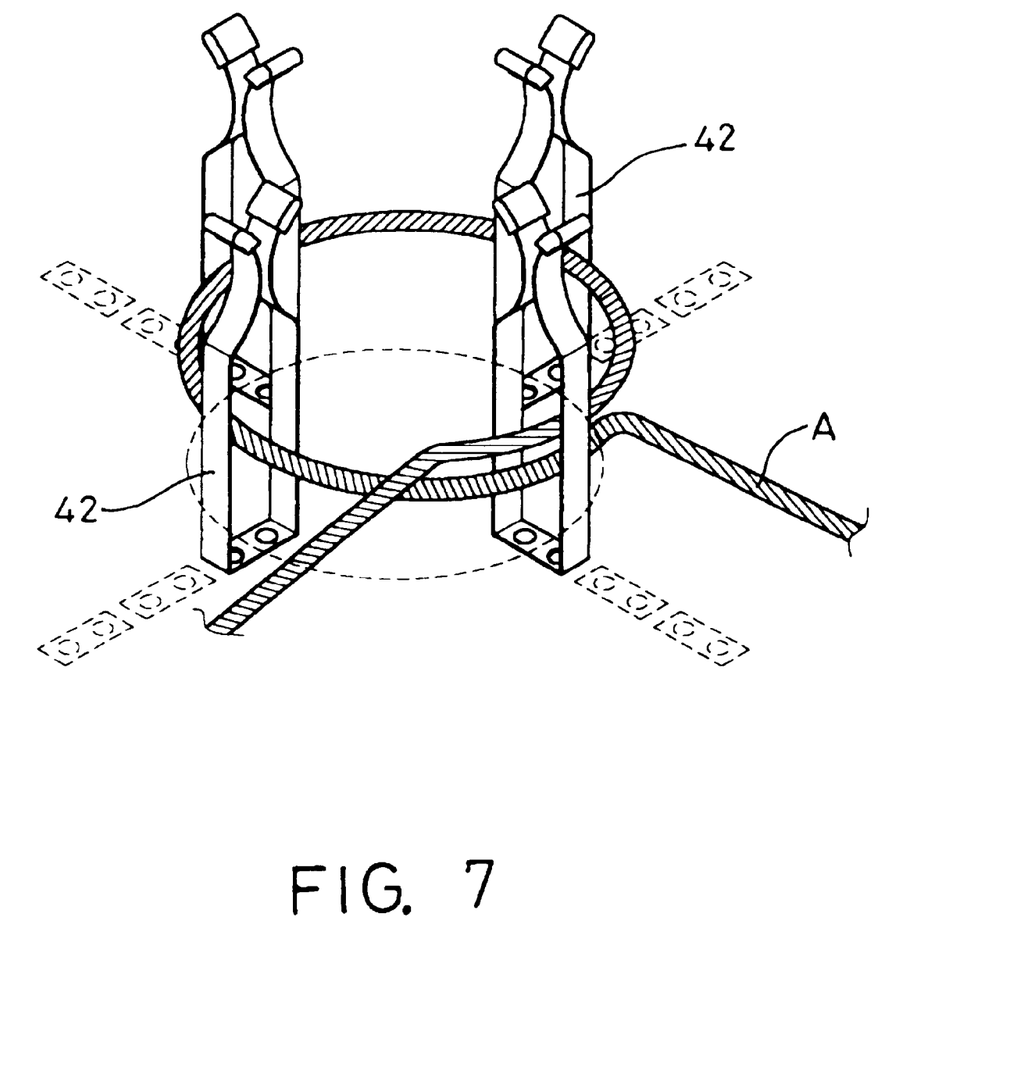
FIG. 7 is a perspective view illustrating a wound wire in the wire collection box.
Figure 81:
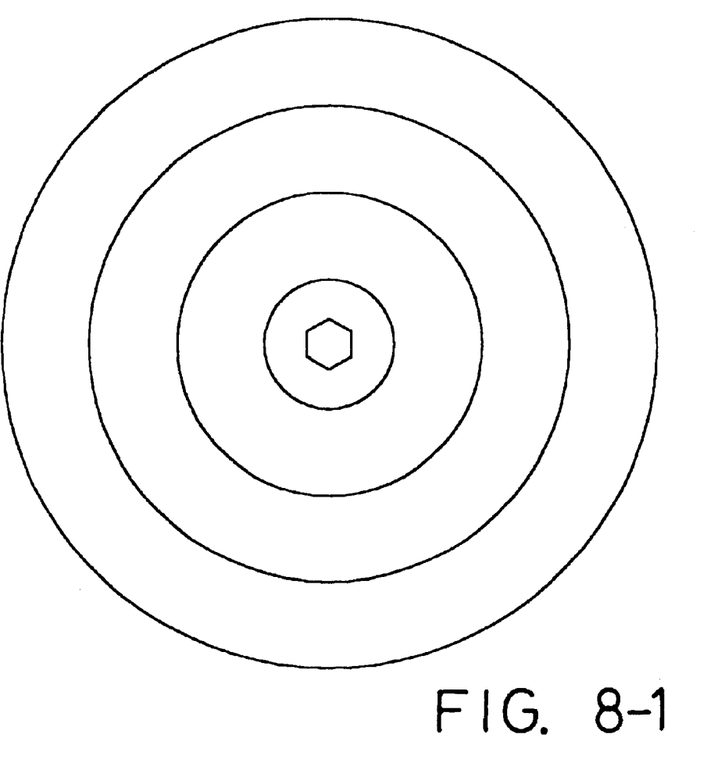
Figure 82:
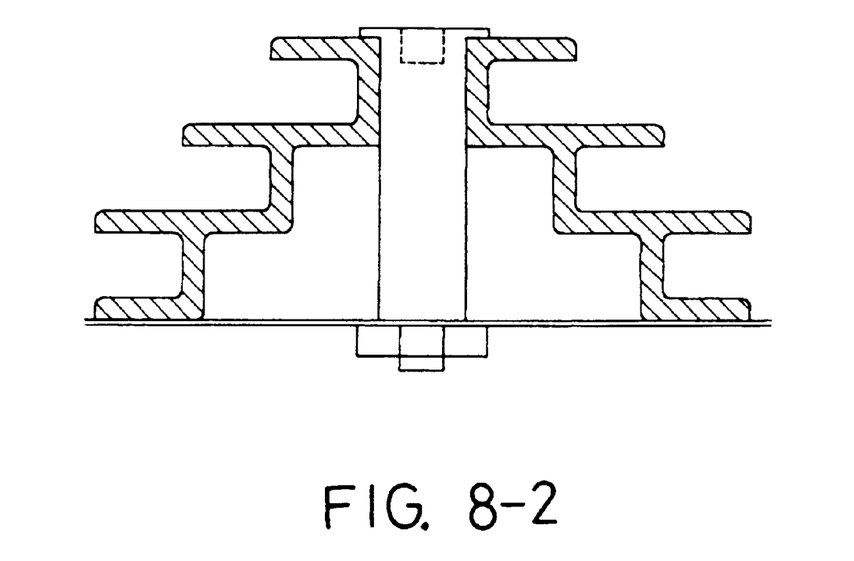

Referring to FIG. 7, an external wire A enters the wire collection box and the extension receptacle 41 can be off and on by way of controlling the switch 412. When the outlets 411 are inserted to connect externally, select a wire holder 42 to be passed through the wire and then the wire is wound around the wire holder group including the wire holder 42 passed by the wire. Finally, the wire passes through one of the wire holders in the group and extends outward via the wire passage. In this way, the excessive part of the wire can be collected and arranged properly during the wire being connected outward for offering power to an external device such as a computer. Hence, in case of all the outlets 411 being inserted with electrical wires, all the wires can be arranged in order as well without mess. The preceding statement is only an example for using the collect box of the present invention and other take-in parts different from the wire holders can also achieve the identical function as well.

If the wire collection box has to be fixed in an office, the fixture 5 is very suitable for clamping the wire collection box securely. The embodiment illustrated in FIG. 1 has all the four lateral plates 2 thereof provided with wire passages 21 so that outgoing wires can be led outward along many different directions.

The switch 412 of the extension receptacle 41 can be arranged to expose via the switch opening 12 in the lower plate 1 or disposed in the wire collection box depending on the designed layout.

It is appreciated that the wire collection box according to the present invention can collect wires in the box systematically and the wires in the box can be wound orderly in spite of the limited space in the box. Hence, it is possible to avoid the occurrence of wires being scattered and being in a mess done by the conventional way and to avoid the phenomenon of unsafe resulting from non-arranged wires.

While the invention has been described with reference to the preferred embodiments thereof, it is to be understood that modifications or variations may be easily made without departing from the spirit of this invention, which is defined by the appended claims.

What is claimed is:

1. A wire collection box, comprising:

a lower plate;

four lateral plates, each of the four lateral plates having a side thereof being joined to the lower plate, and at least one of the four lateral plates having a plurality of vertical wire passages with an upper opening at each of the wire passages, wherein each of the wire passages is attached with a shield sheet with a central split; and a wire plate, being disposed on the lower plate, providing an extension receptacle for taking external electricity, having at least a set of outlets and being attached with a plurality of wire take-in parts, which at least form a wire take-in group for the wire being located at one of the take-in parts and wound around the wire take-in group and passing through one of the wire passages for supplying electricity or transmitting signals.

2. The wire collection box as defined in claim 1, wherein each of the wire passages is longitudinal or L shape with an enlarged circular lower end.

3. The wire collection box as defined in claim 1, wherein an upper lid can be added as a cover.

4. The wire collection box as defined in claim 1, wherein lateral plates can be hinged to the lower plate so as to be moved pivotally.

5. The wire collection box as defined in claim 1, wherein the lower plate or one of the lateral plates can be provided with a switch hole for a switch exposing outward and being operated externally.

6. The wire collection box as defined in claim 1, wherein the lower plate and the wire plate can be provided with air apertures.

7. The wire collection box as defined in claim 1, wherein the wire take-in parts are wire holders and made of an integrally bent metal strip or high molecular strip with a top thereof being a shape of trumpet.

8. The wire collection box as defined in claim 1, wherein the wire take-in parts are step wire spool disks and each of the step wire spool disks can be wound with different wires in different step portions thereof.

9. The wire collection box as defined in claim 1, wherein a fixture can be added for clamping the box externally.

* * * * *